(12) United States Patent
Obara et al.

(10) Patent No.: US 8,131,675 B2
(45) Date of Patent: Mar. 6, 2012

(54) MAP DATA DELIVERING DEVICE, COMMUNICATION TERMINAL, AND MAP DELIVERING METHOD

(75) Inventors: Kiyohiro Obara, Hachioji (JP); Akinori Asahara, Kokubunji (JP); Kishiko Maruyama, Kokubunji (JP); Hideki Hayashi, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 578 days.

(21) Appl. No.: 12/335,697

(22) Filed: Dec. 16, 2008

(65) Prior Publication Data
US 2009/0171976 A1 Jul. 2, 2009

(30) Foreign Application Priority Data
Dec. 27, 2007 (JP) ................. 2007-337296

(51) Int. Cl.
*G06F 17/30* (2006.01)
(52) U.S. Cl. ........ 707/625; 707/611; 707/620; 707/624; 707/626; 707/634; 707/803; 707/805; 701/208; 701/202; 701/200; 701/207; 709/203; 340/995.19; 340/995.14
(58) Field of Classification Search .................. 707/625, 707/624, 611, 620, 626, 634, 803, 805, 999.102, 707/999.107, 999.204; 701/208, 202, 200, 701/207; 709/203; 340/995.19, 995.14
See application file for complete search history.

(56) References Cited

U.S. PATENT DOCUMENTS

| | | | |
|---|---|---|---|
| 2006/0106532 A1* | 5/2006 | Shinato | 701/200 |
| 2007/0213929 A1* | 9/2007 | Tanizaki et al. | 701/208 |
| 2008/0086262 A1 | 4/2008 | Asahara et al. | |

FOREIGN PATENT DOCUMENTS
JP 2006-317643 11/2006
* cited by examiner

*Primary Examiner* — Syling Yen
(74) *Attorney, Agent, or Firm* — Antonelli, Terry, Stout & Kraus, LLP.

(57) ABSTRACT

There is disclosed a map data delivering system for providing consistent road network information from supplement map information and map update information. The map data delivering system includes a navigation terminal and a map distribution server. The map distribution server includes a management data storage unit which stores an update element representing differential update data representing a difference of the map data, and update element management data containing an update element ID for identifying the update element, an update date before the updating of the map data, and a dependent update element ID for storing dependency on the updating of the map data; an update management data selector unit which selects the update element management data having the dependent update element ID among the update element management data having the located area overlapped with the map area of the map distribution request from the navigation terminal and the corresponding update element management data; and a network I/F unit which performs communication with the navigation terminal.

10 Claims, 19 Drawing Sheets

FIG.2

LINK DATA TABLE

| LINK ID | MESH ID | ROAD WIDTH | SUPPLEMENT FLAG | SHAPE COORDINATES DATA | START NODE | END NODE |
|---|---|---|---|---|---|---|
| 001 | 1 | 2 | 1 | [x1,y1; x2,y2;....] | 101 | 111 |
| 002 | 2 | 5 | 2 | [x1,y1; x2,y2;....] | 102 | 112 |
| 003 | 3 | 8 | 3 | [x1,y1; x2,y2;....] | 103 | 113 |
| ... | ... | ... | ... | ... | ... | ... |

FIG.3

NODE DATA TABLE

| LINK ID | MESH ID | COORDINATES | CONNECTED LINK ID |
|---|---|---|---|
| 101 | 1 | x,y | 001 |
| 102 | 2 | x,y | 002 |
| 103 | 3 | x,y | 003 |
| ... | ... | ... | ... |

FIG. 5

UPDATE ELEMENT TABLE

| UPDATE ELEMENT ID | CLASS | OPERATION | OBJECT | OBJECT ID |
|---|---|---|---|---|
| e21 | REGULAR | ADD | LINK | 001 |
| e22 | REGULAR | ADD | NODE | 101 |
| e23 | REGULAR | DELETE | LINK | 002 |
| er02 | SUPPLEMENT | ADD | LINK | 003 |
| ... | | | | ... |

FIG.6A
UPDATE ELEMENT MANAGEMENT TABLE

| UPDATE ELEMENT ID | CLASS | VERSION | UPDATE DATE | LOCATED AREA | DEPEND UPDATE ELEMENT | DEPEND CLASS |
|---|---|---|---|---|---|---|
| e21 | REGULAR | 2 | 2007/3 | (x1,y1)-(x2,y2) | e01 | REGULAR |
| e22 | REGULAR | 2 | 2007/3 | (x1,y1)-(x2,y2) | e11 | REGULAR |
| e23 | REGULAR | 2 | 2007/3 | (x1,y1)-(x2,y2) | e13 | REGULAR |
| er02 | SUPPLEMENT | | 2007/8/15 | (x1,y1)-(x2,y2) | e11 | REGULAR |
| ... | | | ... | ... | ... | ... |

FIG.6B
UPDATE ELEMENT MANAGEMENT TABLE

| UPDATE ELEMENT ID | CLASS | VERSION | UPDATE DATE | LOCATED AREA | DEPEND UPDATE ELEMENT | DEPEND CLASS |
|---|---|---|---|---|---|---|
| e21 | REGULAR | 2 | 2007/3 | (x1,y1)-(x2,y2) | e01,er01 | REGULAR |
| e22 | REGULAR | 2 | 2007/3 | (x1,y1)-(x2,y2) | e11 | REGULAR |
| e23 | REGULAR | 2 | 2007/3 | (x1,y1)-(x2,y2) | e13 | REGULAR |
| er01 | SUPPLEMENT | | 2007/8/15 | (x1,y1)-(x2,y2) | NULL | NULL |
| er02 | SUPPLEMENT | | 2007/2/15 | (x1,y1)-(x2,y2) | e11 | REGULAR |

FLOW CHART ILLUSTRATING MAP UPDATING USED BY RECEIVED
DEPEND RELATION LIST AND UPDATE ELEMENT

FIG.19

| POI ID | MESH ID | COORDINATES | POI NAME | DETAIL INFORMATION |
|---|---|---|---|---|
| 1001 | 1 | x,y | FRIED NOODLE SHOP ANGEL | 342-2, DAIGYOJI 0285-23-3696 |
| 1002 | 2 | x,y | KOKONOE MAIN STORE | 25-11, JOTO 6-CHOME 0285-23-3315 |
| 1003 | 3 | x,y | CHINESE-JAPANESE DRINKING SALOON CHAOZU | 2-22, HONGO-CHO 2-CHOME 0285-28-9151 |
| ... | ... | ... | ... | ... |

MAP DATA DELIVERING DEVICE, COMMUNICATION TERMINAL, AND MAP DELIVERING METHOD

CLAIM OF PRIORITY

The present application claims priority from Japanese patent application JP-2007-337296 filed on Dec. 27, 2007, the content of which is hereby incorporated by reference into this application.

BACKGROUND OF THE INVENTION

The present invention relates to a map data delivering system, a map data delivering method, and a communication terminal in relation to technologies for delivering and updating map data.

In a conventional car navigation system (hereinafter, referred to as a car navigation), in order to compensate for disadvantages such as difficulties of carrying it due to solid fixation to a car structure or of operating or using a display interface, a service has been realized for connecting from a personal computer located in a user's home to a dedicated website via the Internet, executing a destination search or route setup, and downloading the results to a car navigation. Particularly, a car navigation internally including a hard disk drive (HDD) can store a large amount of data, and thus, the aforementioned services can be readily realized.

In the aforementioned website, point of interest (POI) information is provided with much more latest information in comparison with internal information of a car navigation. In addition, when information is provided and shared between users of the website, detailed local information and destinations not included in a typical car navigation map can be obtained and set.

When such information is downloaded onto a car navigation, the POI information is established based on latitude and longitude information common to all devices. Therefore, the downloaded information is allowed to be used as a destination of traveling route search in a car navigation system.

On the other hand, the route information searched or shared from such a website can be input to a car navigation in the format of a set of latitude and longitude information. However, in some cases, the same route can be differently represented in a car navigation due to inconsistency of a map version or a detailed view. For example, while a bypass road is opened to traffic according to a map on the website, the map of the car navigation may not appropriately reflect the bypass road if it has an old version.

In order to address such a problem, when the map of a car navigation does not have road network information corresponding to the route information, a method of supplementing the lost road network information based on the route information has been proposed. For example, when the map of a car navigation is shown in FIG. 17A, the road network information passing through areas 4, 5, and 6 is needed, road network information represented by a dotted line of FIG. 17B is added to the format of a conventional road network as supplement map information. As a result, any route representation can be displayed, and a route search or a route guide can be implemented using a conventional algorithm.

In addition, a latest version of the map information of a car navigation is distributed on a regular basis, and a user can obtain the latest version of the map and update any version of the map. For example, in a patent document JP-A-2006-317643, a method of downloading the latest version of the map in plural methods and updating the map is disclosed.

BRIEF SUMMARY OF THE INVENTION

However, according to the method disclosed in a patent document JP-A-2006-317643, the supplement map information has some problems when the map is updated.

As one of the problems, a paste and delete case can be exemplified. Now, this case will be described with reference to FIGS. 17A, 17B, 18A, and 18B. For example, it is assumed that a part of a bypass road A passing through areas 4, 5, and 6 is opened to traffic in February 2007 (FIG. 17A), the entire road is opened in August 2007 (FIG. 17B), and an update version of the car navigation map is released in May 2007 (FIG. 18A). Also, it is assumed that the car navigation map is updated by creating road information of the bypass road A as supplement map information based on route information of September 2007 after the entire bypass road A is opened to traffic (FIG. 17B). Typically, an update version of the car navigation map does not immediately reflect change of the road due to a time delay caused by electronic conversion, media creation, distribution, or other processes. Even in this case, information released in May 2007 is still used (FIG. 18A).

Since the map in this case is updated using the map released in May 2007, in which only a part of the bypass road A has been opened (FIG. 18A), information on the entire bypass road A already created from the route information is deleted.

In order to prevent such inappropriate deletion, a means for continuously storing the supplement map information without deleting it can be contemplated. However, in this case, the road network information of partially opened blocks may be redundantly stored in the supplement map information and the new updated map information (FIG. 18B). Such a redundant operation for storing the road network is not acceptable because it can affect a road display algorithm or a route search algorithm of the car navigation.

Such a problem can be avoided by equally treating the supplement map information and the regular map update information. However, accuracy of information is reduced as described above. Also, enormous efforts are required for a map service provider to collect all of the supplement map information arbitrarily created by users from the route information.

In other words, problems such as information loss in the road network data or the redundant storing operation are generated when regular map update information and supplement map information arbitrarily created by a user from the route information or the like are used together.

In order to address the aforementioned problems, the present invention provides a map data delivering system which generates consistent road network information from supplement map information and map update information.

In addition, the present invention provides a method of delivering map data using the map data delivering system.

Furthermore, the present invention provides a car navigation system that can reduce a data processing amount and a communication amount for generating consistent road network information.

According to an aspect of the present invention, there is provided a map data delivering system having a communication terminal and a map data delivering device for delivering map data to the communication terminal, wherein the map data delivering device includes: a storage unit for storing differential update data representing a difference before and after updating of the map data, an update element representing a set of differential update data, and update element management data containing an update element ID for identifying the update element, a located area overlapped with a map area of the differential update data, an update date before the updating of the map data, and a dependent update element ID for storing dependency on updating of corresponding map data; a map distribution request receiver which receives a request for delivering the update element, the update element management data, and the differential update data from the communication terminal; an update management data selector which selects the update element management data having the dependent update element ID from the management data storage unit among the update element management data having the located area overlapped with the map area of the distribution request and the corresponding update element management data; and an update data distribution unit for transmitting the update element and the differential update data managed by the selected update element management data and the corresponding update element management data to the communication terminal, and wherein the communication terminal has a map update unit which updates the map data based on at least the received differential update data, the update element, and the update element management data.

In the map data delivering system according to the present invention, the update management data selector may execute a process of selecting the update element management data having the located area from the management data storage unit until the dependent update element ID affecting the updating of the map data is not included.

In the map data delivering system according to the present invention, the differential update data may includes node and link data.

In the map data delivering system according to the present invention, wherein the distribution request may include a map version of the communication terminal or the update time information, the update data delivering unit delivers the update element management data, the update element, and the corresponding differential update data having a version of the map or the update time information obtained at the time of or later than a version of the map or the update time information included in the distribution request among the update element management data selected by the update management data selector.

In the map data delivering system according to the present invention, the map data delivering device may have a supplement map information generator which creates link data representing a road network and node data representing an intersection of existing roads based on route data which is a set of information including input latitude and longitude values, creates a supplement update element for adding information different from the existing link and node data to the node and link data as the differential update data having an attribute of supplement and supplement update element management data for managing the corresponding supplement update element and stores it in the storage unit, and represents the update element ID which has the located area overlapped with a map area of the supplement update element and is designated by the latest supplement update element management data as the dependent update element ID in the supplement update element management data.

According to another aspect of the present invention, there is provided a method of delivering map data in a map data delivering system and a communication terminal.

According to the present invention, it is possible to allow a user to use together supplement map information arbitrarily created from node information and the map updating. It is possible to provide a map data delivering system capable of obtaining a newer or more detailed map than the regular update map information as route information and arbitrarily using it including determination on whether or not the map is applied. Also, it is possible to provide a method of delivering map data using the map data delivering system.

Furthermore, since information loss or redundant storing operation is not prevented when the map is updated, it is possible to provide a communication terminal capable of using a conventional road sign or route searching algorithm without change.

BRIEF DESCRIPTION OF THE DRAWINGS

FIG. 2 is a diagram illustrating a link data table in the map data delivering system according an embodiment;

FIG. 3 is a diagram illustrating a node data table in the map data delivering system according to an embodiment;

FIG. 5 is a diagram illustrating an update element table in the map data delivering system according to an embodiment;

FIGS. 6A and 6B are diagrams illustrating an update element management table in the map data delivering system according to an embodiment;

FIG. 19 is a diagram illustrating a POI information data table in the map data delivering system according to an embodiment.

DETAILED DESCRIPTION OF THE INVENTION

Hereinafter, embodiments of the present invention will be described in more detail with reference to the accompanying drawings.

Figure 1:
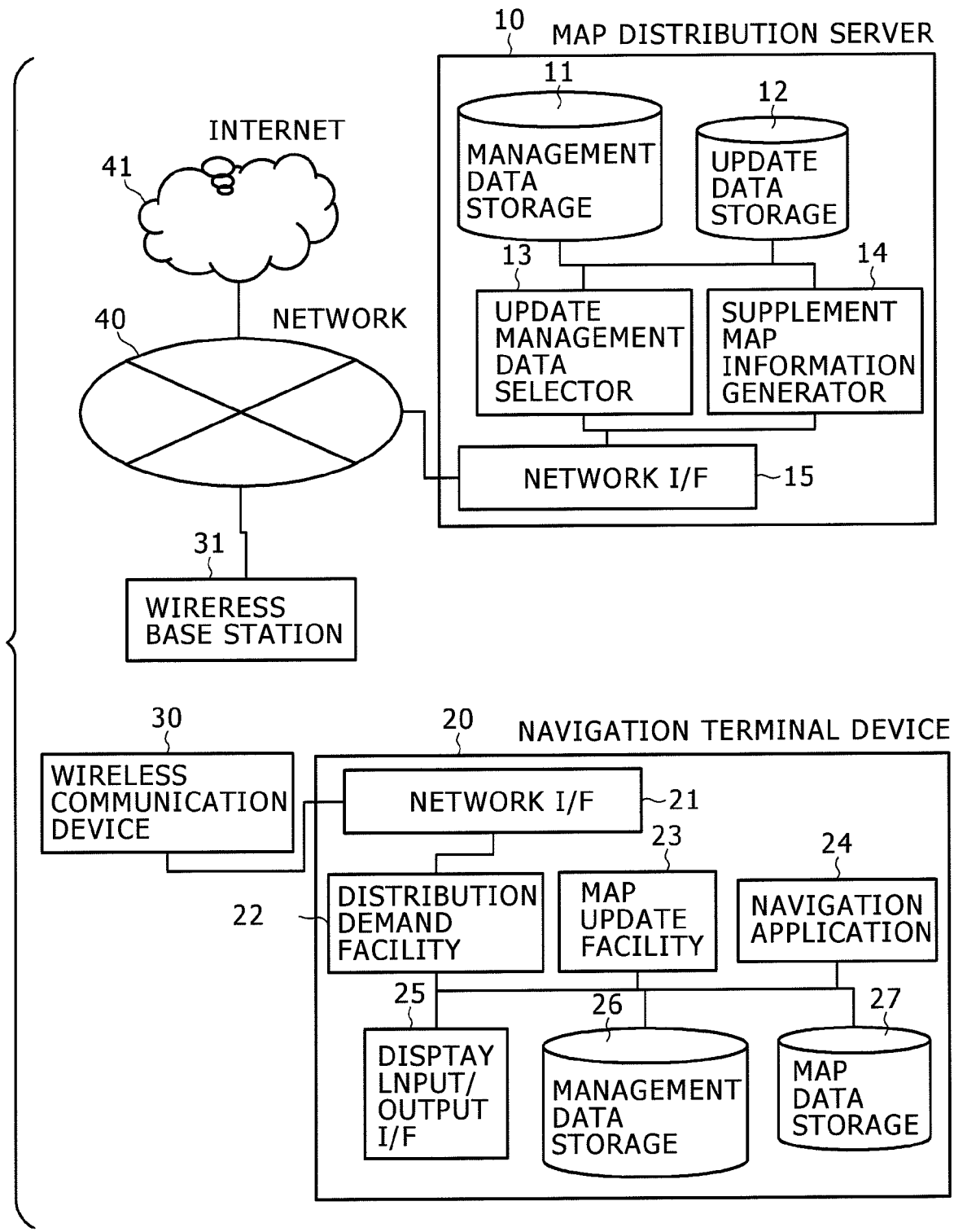
FIG. 1 is a diagram illustrating a map data delivering system according to an embodiment.

FIG. 1 is a diagram illustrating a map data delivering system according to an embodiment of the present invention.

A map data delivering system according to the present embodiment includes a navigation terminal 20 and a map distribution server 10 connected to a network 40. A wireless communication device 30 is connected to the navigation terminal 20. The navigation terminal 20 is connected to the network 40 using the wireless communication device 30 via the wireless base station 31. The wireless communication device 30 may be internally provided in the navigation terminal 20.

The map distribution server 10 delivers updated portions of the map data to the navigation terminal 20 in response to a map distribution request received from the navigation terminal 20.

As shown in FIG. 1, the map distribution server 10 includes: a network I/F (interface) unit 15 for connecting the map distribution server 10 to the network 40; an update data storage unit 12, a management data storage unit 11; an update management data selector unit 13; and a supplement map information generator unit 14. The map distribution server 10 is controlled by a program embedded in a CPU (not shown in the drawings) and a memory unit (not shown in the drawings).

The update data storage unit 12 stores map update data (such as map information or road network information) containing information on map components (i.e., features) as a unit. Specifically, the map update data includes a link data table shown in FIG. 2 and a node data table shown in FIG. 3. A map is expressed by the contents of these data. Furthermore, the map data are updated by adding or deleting these data.

Figure 4A:
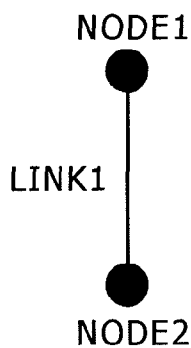
FIGS. 4A to 4C are diagrams illustrating a method of updating road data in the map data delivering system according to an embodiment.
Figure 4B:
Figure 4C:
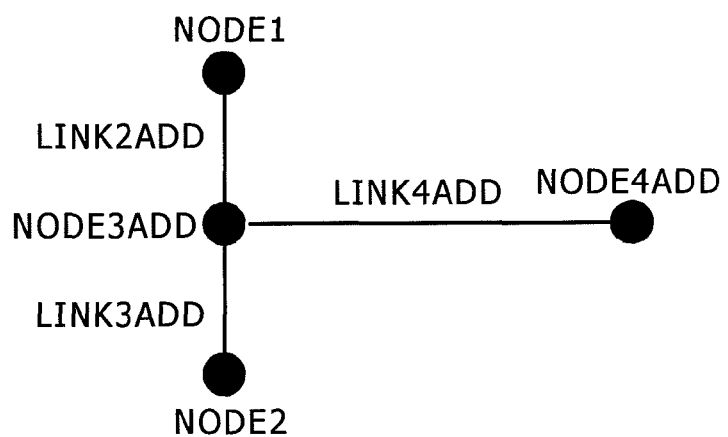

FIGS. 4A to 4C are diagrams illustrating an update process. In order to change a straight road shown in FIG. 4A into a T-shaped road, a link link1 including the straight road is deleted as shown in FIG. 4B. Then, as shown in FIG. 4C, a link link2 having one node node2 and the other node node3, a link link3 having one node node2 and the other node node3, and a link link4 having one node node3 and the other node node4 are added. Data for instructing such a series of deleting and adding processes are update elements, which will be described later, and data objected to these processes are update data.

The management data storage unit 11 stores an update element table shown in FIG. 5 and an update element management table shown in FIGS. 6A and 6B.

In the update element table, update elements corresponding to data on addition/deletion instructions for updating map data are recorded. An update element may include: an update element ID for identifying the update element; a class of the update element, which will be described later; operation of the update; object data to be updated; and an object ID. Using one record of the update element table, addition or deletion of one link or node can be expressed. As shown in FIGS. 4A to 4C, when a set of addition/deletion processes occur, they can be expressed as plural records having the same update element ID.

In the update element management table, data for managing the update elements are recorded. As shown in FIGS. 6A and 6B, records of the update element management table may include: an update element ID for identifying the update; a class of the update element; a version and an update date of the map to be updated; a map area (i.e., a located area) where the feature expressed by the update data exists; a dependent update element ID, which will be described later; and a class of the update element of the depending destination. In addition, according to the present embodiment, a located area is expressed by a rectangular shape specified by a maximum x-coordinate value, a minimum x-coordinate value, a maximum y-coordinate value, and a minimum y-coordinate value of a feature. As information for specifying the located area, a coordinate value of an intersection of the diagonal lines of the rectangular shape is used. In occasion, there may be plural dependent update element IDs and plural depending destination classes.

Figure 7A:
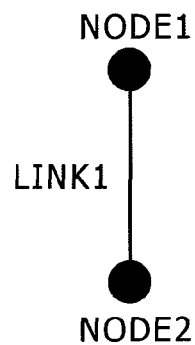
FIGS. 7A to 7C are diagrams illustrating dependency of update elements in the map data delivering system according to an embodiment.
Figure 7B:
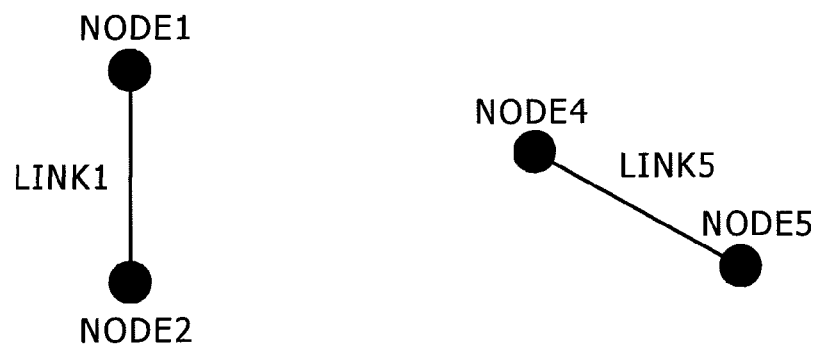
Figure 7C:
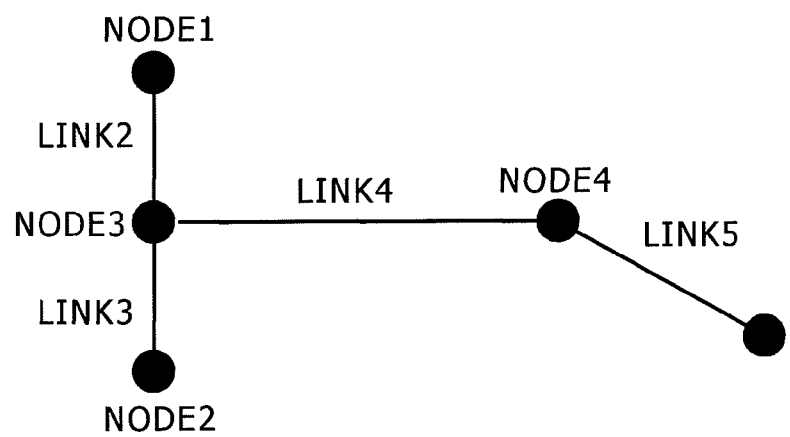

The dependent update element ID is an identification of the update element required to be updated previously before the corresponding update, which is another differential update data affecting a connection relationship of the feature. FIGS. 7A to 7C illustrate an example of dependency of the update elements. Initially, there is a straight road including the link link1 shown in FIG. 7A. Then, as shown in FIG. 7B, a road including a link link5 and nodes node4 and node5 has been opened to traffic. In this case, an update element expressing an additional road including a link link5 and nodes node4 and node5 is set to an update element 1.

In addition, as shown in FIG. 7C, a T-shaped road including links link2, link3, and link 4 is added, and this update element is set to an update element 2. It should be noted that the update element 2 has dependency because it is presupposed that there is a node node4 added to the update element 1. In this case, the update element 1 becomes a dependent update element ID of the update element 2.

The class of the update element means a classification of the update. Typically, the map information of the navigation terminal 20 is updated once per several months. The class of the update element for such a typical regular update of the map is designated as "Regular". According to the present embodiment, in addition to the regular update of the map, an example of arbitrary map updating based on map information will be described. A class of the update element for such an arbitrary update is designated as "Supplement". Hereinafter, an update element having a class of "Regular" will be referred to as a regular update element, and an update element having a class of "Supplement" will be referred to as a supplement update element.

Figure 8:
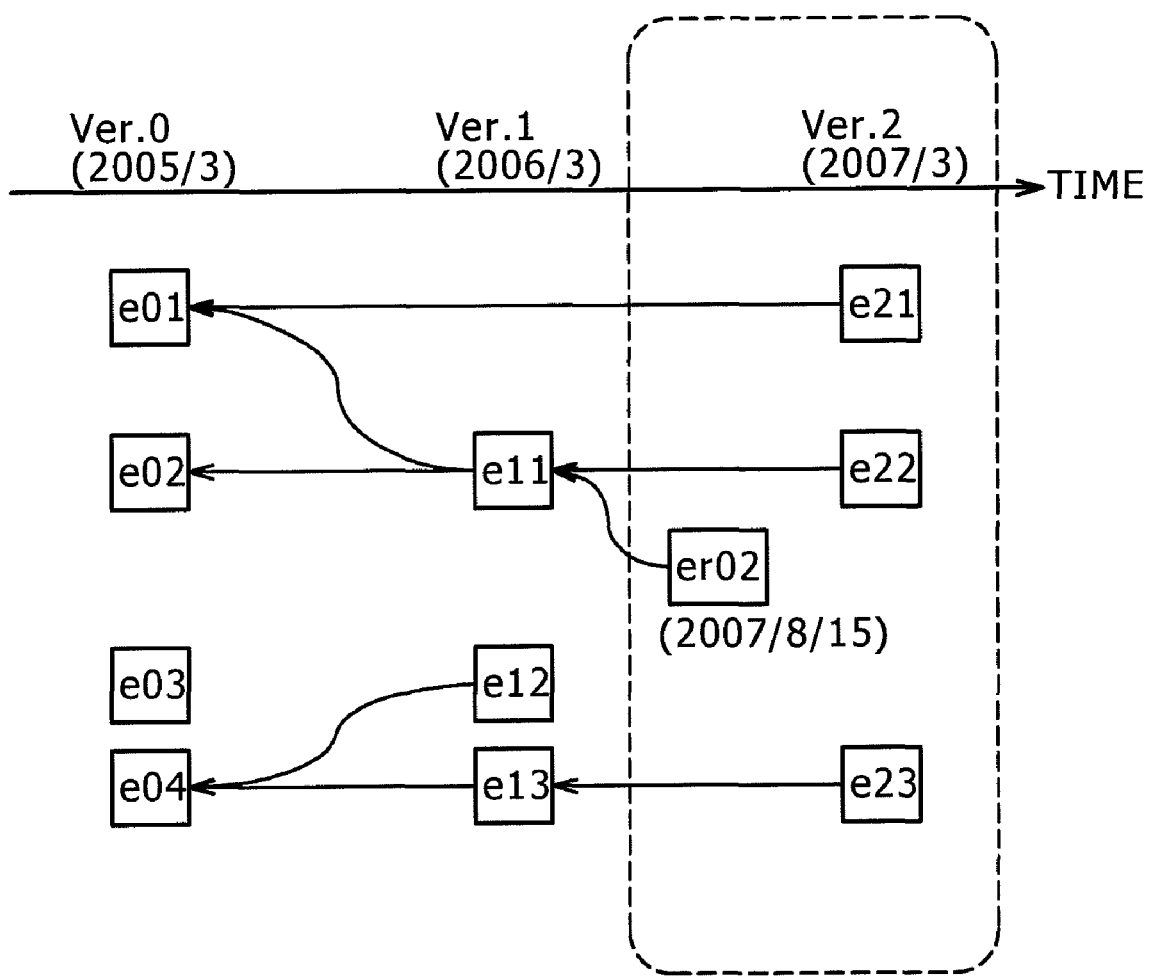
FIG. 8 is a diagram illustrating dependency of update elements in the map data delivering system according to an embodiment.

FIG. 8 is a diagram illustrating an example of dependency of the update elements. In this drawing, each of the rectangles denotes an update element, and each arrow denotes dependency. An example of the update element management table of FIG. 6A shows update elements surrounded by a dotted line of FIG. 8. In FIG. 8, it is assumed that the map data is updated from a version Ver. 1 to a version Ver. 2. Newer update elements than a version Ver. 1 are e21, e21, e22, e23, and er02. Update element IDs having dependency on these update elements are e01, e11, e13, and e11, respectively. However, there are update element IDs e02, e03, e04, and e12 in FIG. 8. Among them, although the update element IDs e02 and e04 have dependency on the update of a version Ver. 1, they don't have dependency on a version Ver. 2. Therefore, while the update element IDs e02 and e04 are listed in the update element management table as dependent update element IDs of a version Ver. 1, they are not necessary in the update of a version Ver. 2.

Returning to FIG. 1, the network I/F unit 15 is a map distribution request receiver for receiving a map distribution request from the navigation terminal 20 via the network 40. Also, the network I/F unit 15 functions as an update data transmitter unit for transmitting the map update data to the navigation terminal 20. It should be noted that the map distribution request includes a network address of the map distribution server 10 which is a destination, a network address of the navigation terminal 20 which is a source, and information on a version or update time of the map after the navigation terminal 20 has updated the map data (has completed the update). Among the update element management data selected by the update management data selector unit 13, the update data includes update element management data and update element information having a map version or update time information obtained at the time of or later than a map version or update time information included in the distribution request. The update element management data and update elements preceding a version of the map or update time information included in the distribution request are excluded.

The update management data selector unit 13 selects link data, node data, update elements, and update element management data based on an algorithm, which will be described later, and transmits them to the navigation terminal 20 using the network I/F unit 15. In FIG. 8, as described above, the update element management data includes a dependent update element ID that does not affect the update of the corresponding map data as well as a dependent update element ID affecting the update of the map data. Therefore, the update management data selector unit 13 selects all data having the dependent update element ID affecting the update of the map data. In other words, the selection process is executed until any dependent update element ID affecting the update of the map data is not included.

The supplement map information generator unit 14 obtains route information via The Internet or the like, generates a supplement update element, link data, and node data as supplement map information, stores the supplement update element in the management data storage unit, and stores the link data and node data in the update data storage unit. These data have the same format as that of other map information except that the class of the update element is designated as "Supplement".

The link data, the node data, and the supplement update element obtained from route information (e.g., a set of latitude and longitude information) are created by two steps as follows. In the first step, road network information expressed by links and nodes is created from the route information (e.g., a set of latitude and longitude information). In the second step, the supplement update element and the final link and node data are created from the created road network information.

The first step for generating the road network information from the route information (e.g., a set of latitude and longitude information) is achieved by setting nodes in the intersections between this route and other existing roads and connecting the nodes to each other by links. A method of creating a road network from the route information is well known in the arts such as JP-A-2007-179373. By executing this process, road network information (for example, as shown in FIG. 4C) represented by link data and node data is created from the route information.

Figure 9:
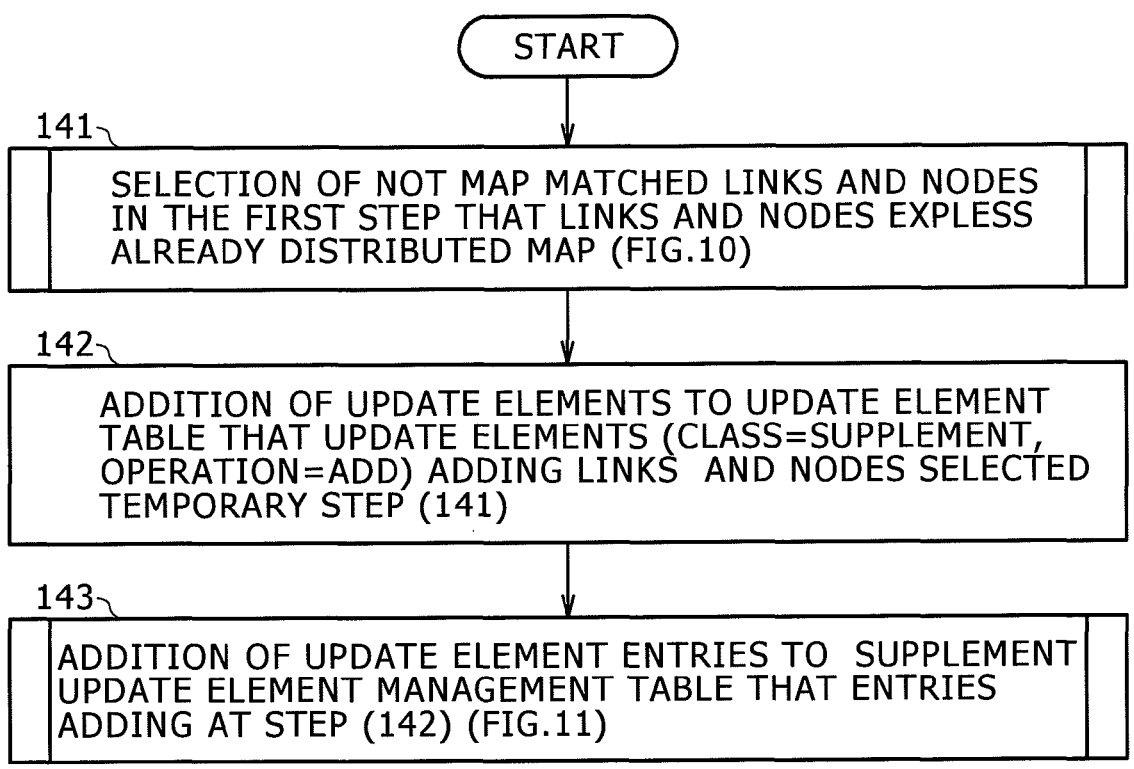
FIG. 9 is a flowchart illustrating creation of a supplement update element in the map data delivering system.
Figure 10:
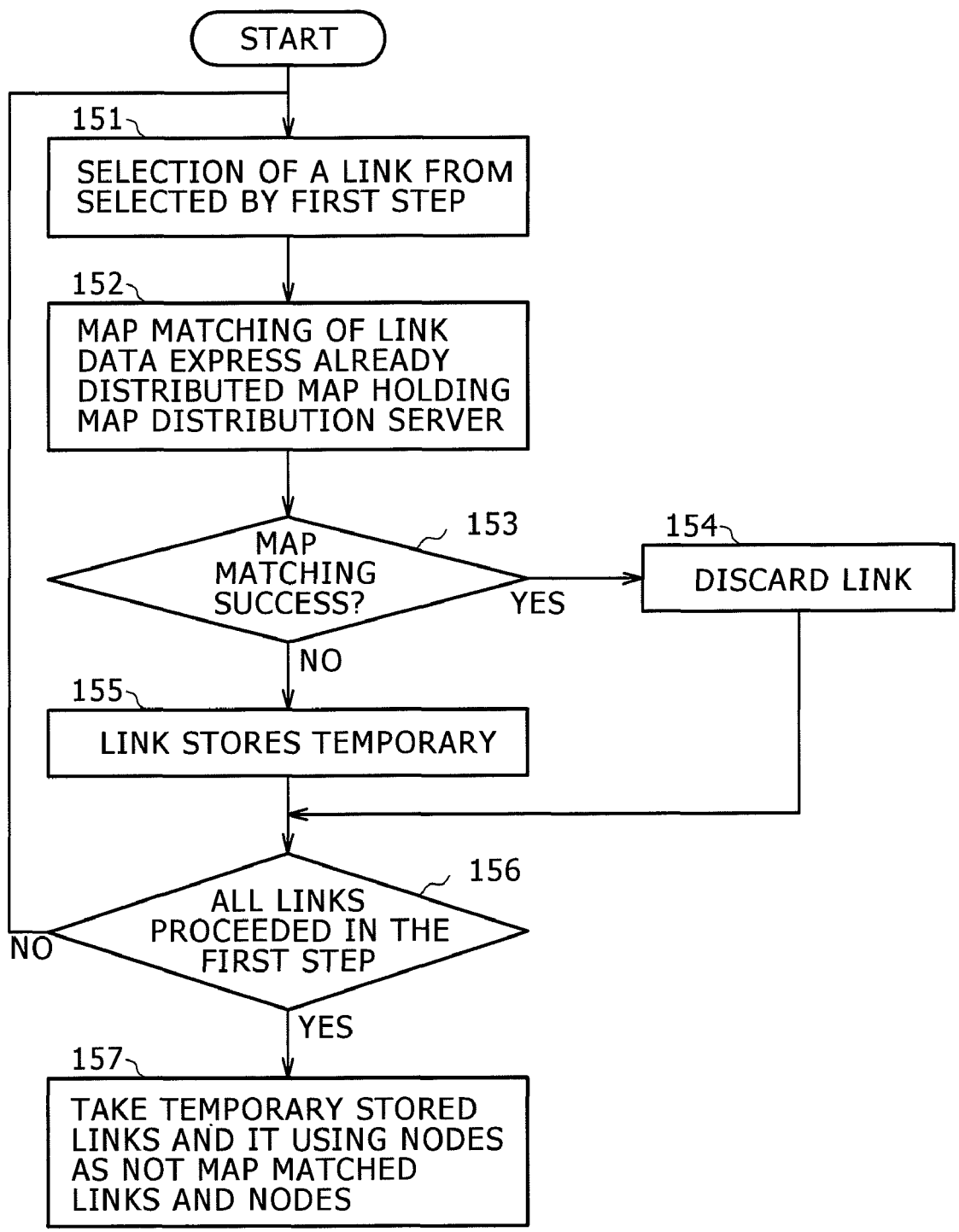
FIG. 10 is a flowchart illustrating creation of a supplement update element in the map data delivering system.
Figure 11:
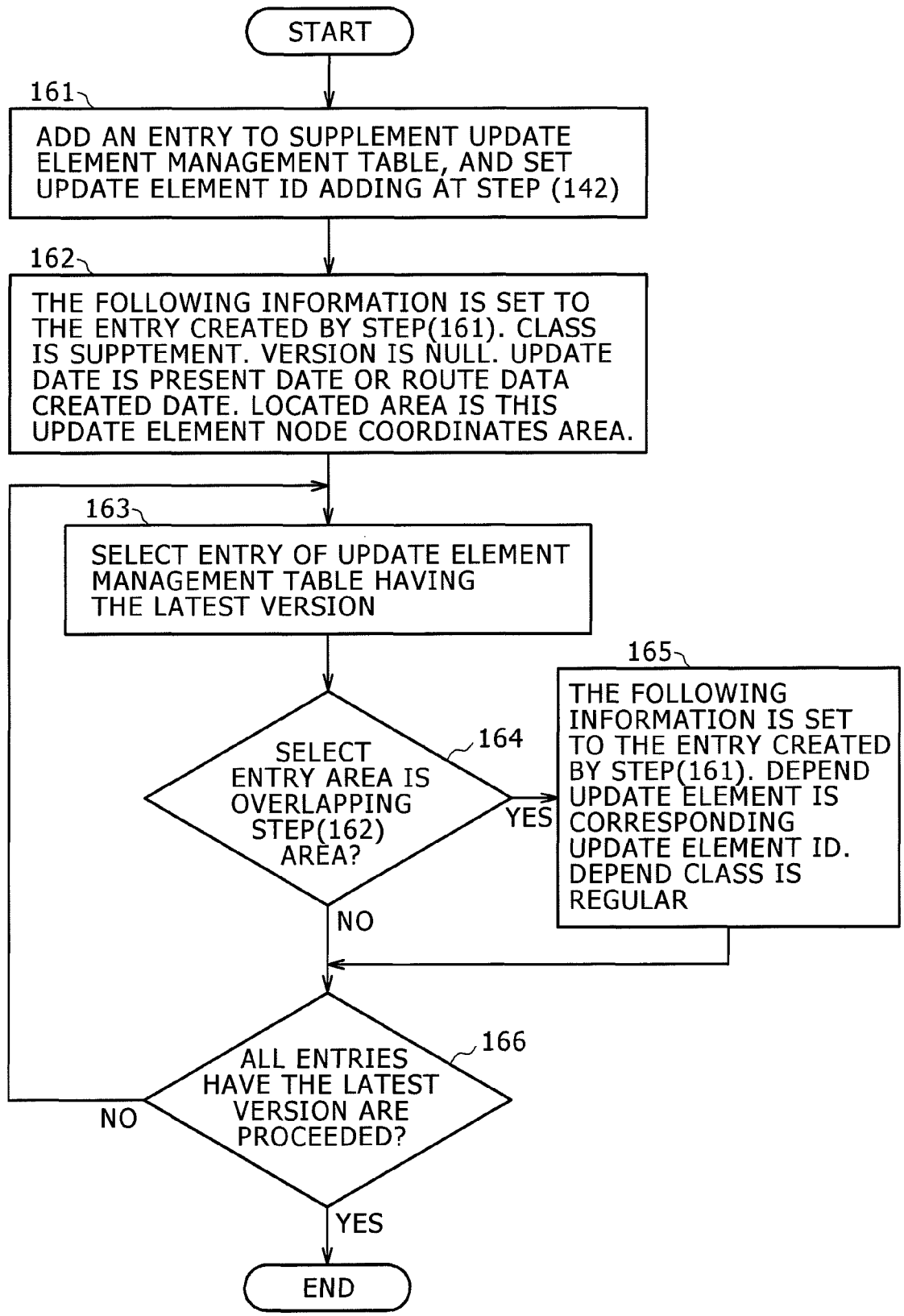
FIG. 11 is a flowchart illustrating creation of a supplement update element in the map data delivering system.

FIGS. 9 to 11 are flowcharts illustrating creation of a supplement update element. As shown in FIG. 9, first or all, as a second step, a map matching is executed between all of the link data generated in the first step and the link data representing existing roads stored in the map distribution server to select mismatching roads as additional roads (141). The map matching is determination on whether or not the link information represents the same road as the existing road.

Specifically, as shown in the flowchart of FIG. 10, it is examined whether or not a difference of road configuration coordinate column data between the created link data and the link data representing existing roads stored in the map distribution sever is within a predetermined range (152). If the difference is within the predetermined range, it is determined that the map matching is successful (153). The link data that has been unsuccessful in the map matching is stored as additional roads (155). The link data that has been successful in the map matching is discarded because it is overlapped with the existing road (154). Furthermore, among the node data created in the first step, any node that does not use the link stored in step 155 is discarded (157).

Returning to the flowchart of FIG. 9, subsequent to steps 155 and 157, supplement update elements for adding the selected link data and node data are added to the update element table (142).

Data of the update element management table for representing dependency is created by managing the update elements generated in the above step 142 (143).

Specifically, as shown in the flowchart of FIG. 11, the entries having the latest version of the update element management table are set as follows. The update element ID is set to the update element ID created in step 142, the class is set to "Supplement", the version is set to NULL, the update date is set to a present date or a route data created date, and the located area is set to a range of the node data of this update element (161 and 162). Furthermore, an entry having a located area overlapped with this update element is searched from the update element management table (163 and 164). If there is an overlapped entry, the update element ID of the corresponding entry is added to columns of the dependent update element and the depending destination class, and the depending destination class is designated as "Regular". The reason why only the entry of the latest version is targeted is to create a difference for the latest map information.

Through the aforementioned steps, a supplement update element can be created.

Returning to FIG. 1, the navigation terminal 20 executes navigation processes such as a map displaying, a route searching, and a route guidance using the map data stored therein. In addition, it transmits to the map distribution server 10 a map distribution request containing a map version information after the map data has been updated (after completing the update), and receives the update data from the map distribution server 10. The received update data is reflected on the map data stored therein.

As shown in FIG. 1, the navigation terminal 20 includes: a network I/F unit 21 for connecting the navigation terminal 20 to the network 40 via the wireless communication device 30 and the wireless base station 31; a distribution request unit 22, a map update unit 23, a map data storage unit 27; a navigation application unit 24; a display input/output I/F unit 25 which displays information to a user and receives instructions from a user; and a management data storage unit 26. The navigation terminal 20 is controlled by a program embedded in a central processing unit (CPU, not shown in the drawings) and a memory unit (not shown in the drawings).

The management data storage unit 26 stores update element management data delivered from the map distribution server as a dependency list. The table configuration is identical to that of the map distribution server shown in FIGS. 6A and 6B.

The distribution request unit 22 creates a map distribution request in response to a user's instruction input regularly or arbitrarily from the display input/output I/F 25, and transmits the map distribution request to the map distribution server 10 through the network I/F 21. It should be noted that the map distribution request is used to request deliver the aforementioned update element management data, the update element, and the differential update data.

The network I/F unit 21 functions as a transmitter which transmits the distribution request to the map distribution server 10 and a receiver which receives from the map distribution server 10 the update element management data, the update element, and the differential update data.

The map update unit 23 accumulates delivered data including the update element management data, the update element, and the differential update data received from the distribution request unit 22, and executes map updating according to an algorithm which will be described later.

The map data storage 27 stores the link data and the node data. These data have the same format as those of the link and node data stored in the update data storage unit of the map distribution server 10. FIGS. 2 and 3 show details of the format.

In the link data, data on each of the links corresponding to roads on the map are recorded. FIG. 2 shows an example of the contents of the link data. As shown in FIG. 2, the records of the link data may include: a link ID for identifying the link; a mesh ID for identifying an area where the link is located; a road width of the link; a class flag representing a road type such as a public road or a toll road of the link; shape coordinates data containing coordinates data of a dot sequence (including a start node, an end node, and an intermediate node located in a bending point of the link) expressing the shape of the link; a start node ID of the link; and an end node ID of the link.

In the node data, data on each of the nodes included in the link registered in the link data are recorded. FIG. 3 shows an example of contents of the node data. As shown in FIG. 3, the records of the node data include: a node ID for identifying the node; a mesh ID for identifying an area where the node is located; coordinates data of the node; and a connected link ID of the link having the corresponding node as a start node or an end node.

The navigation application 24 executes a navigation process such as a map displaying, a route searching, and a route guidance using the link data recorded in the link data table and the node data recorded in the node data table.

Figure 12:
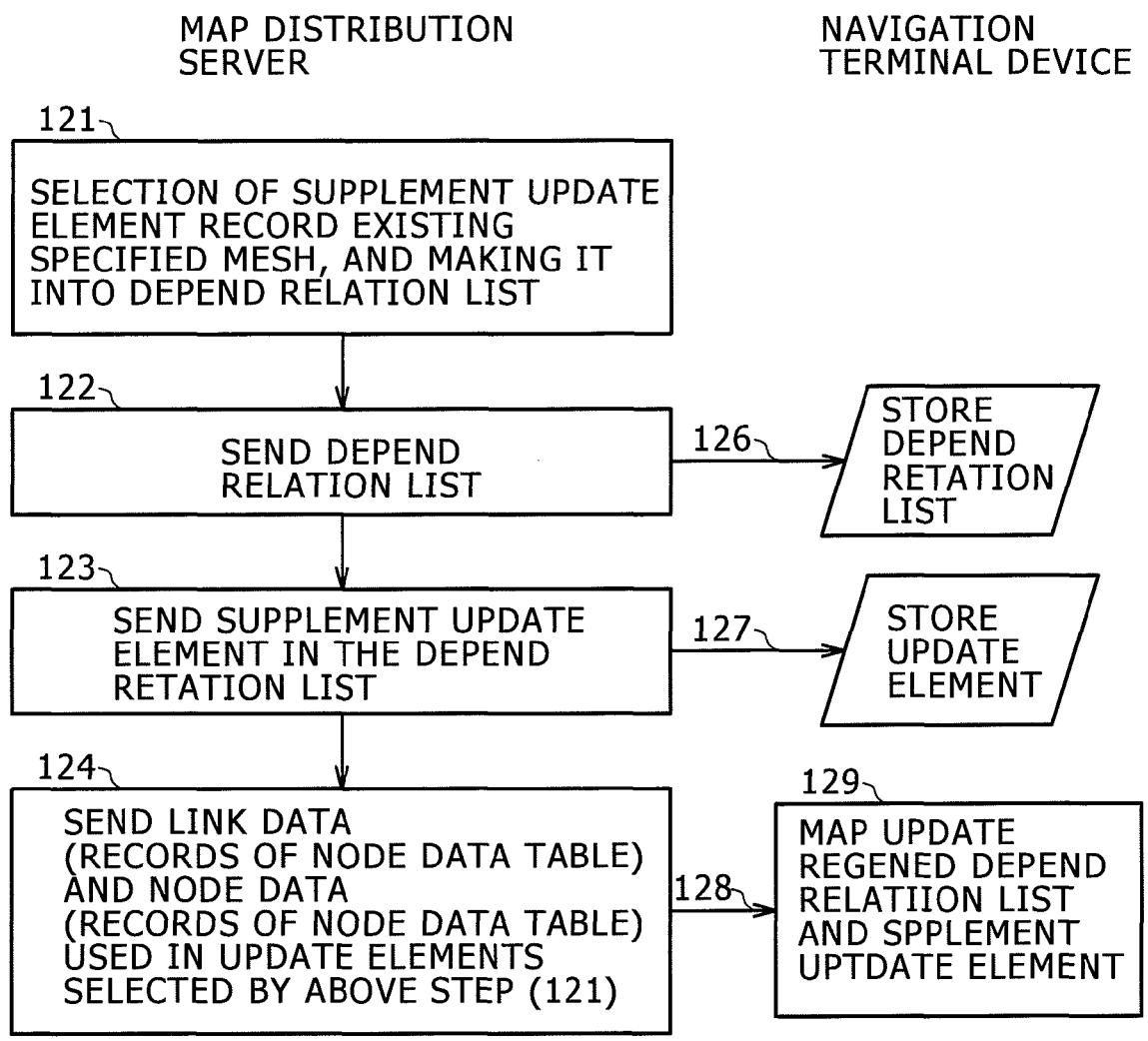
FIG. 12 is a diagram illustrating operation of delivering supplement map information in the map data delivering system.

FIG. 12 is a diagram illustrating operation of delivering the supplement map information.

The map distribution server 10 initiates to deliver the supplement map information when a predetermined event occurs. The predetermined event may be a request from the navigation terminal 20 or a user's instruction received via a network, but not limited thereto. In addition, a method of designating the supplement map information to be delivered may be based on an area, an ID, a created data, a creator, or the like. Operation when an area is designated will be described with reference to FIG. 12.

In the map distribution server 10, the update management data selector unit 13 searches the update element management table of the management data storage unit 11 to select records of the supplement update element located in a selected area and create a dependency list (121).

Then, the update management data selector unit 13 transmits the dependency list to the navigation terminal 20 through the network I/F unit 15 (122). The navigation terminal 20 stores the dependency list transmitted in step 122.

Subsequently, the update management data selector unit 13 searches the corresponding supplement update element from the update element table based on the dependency list created in step 121, and transmits the element to the navigation terminal 20 through the network I/F unit 15 (123). The navigation terminal 20 stores the supplement update element transmitted in step 123.

Furthermore, the update management data selector unit 13 searches the link data (i.e., the records of the link data table) and the node data (i.e., the records of the node data table) objected by the supplement update element searched out in step 121, and transmits the records to the navigation terminal 20 through the network I/F 15 (124).

The navigation terminal 20 updates the map using the received dependency list, the update element, and the node and link data (129). In this case, operation of the map updating is a process of adding or deleting the objected link or node based on the information recorded in a column of "Operation" in the obtained supplement update element.

As a result of the aforementioned operation, it is possible to obtain supplement map information arbitrarily created by a user from the route information. In addition, it is possible to prevent information loss or redundant storing operation when the map is updated. Therefore, it is possible to utilize a traffic sign or a route searching algorithm of the conventional car navigation without change.

Figure 13:
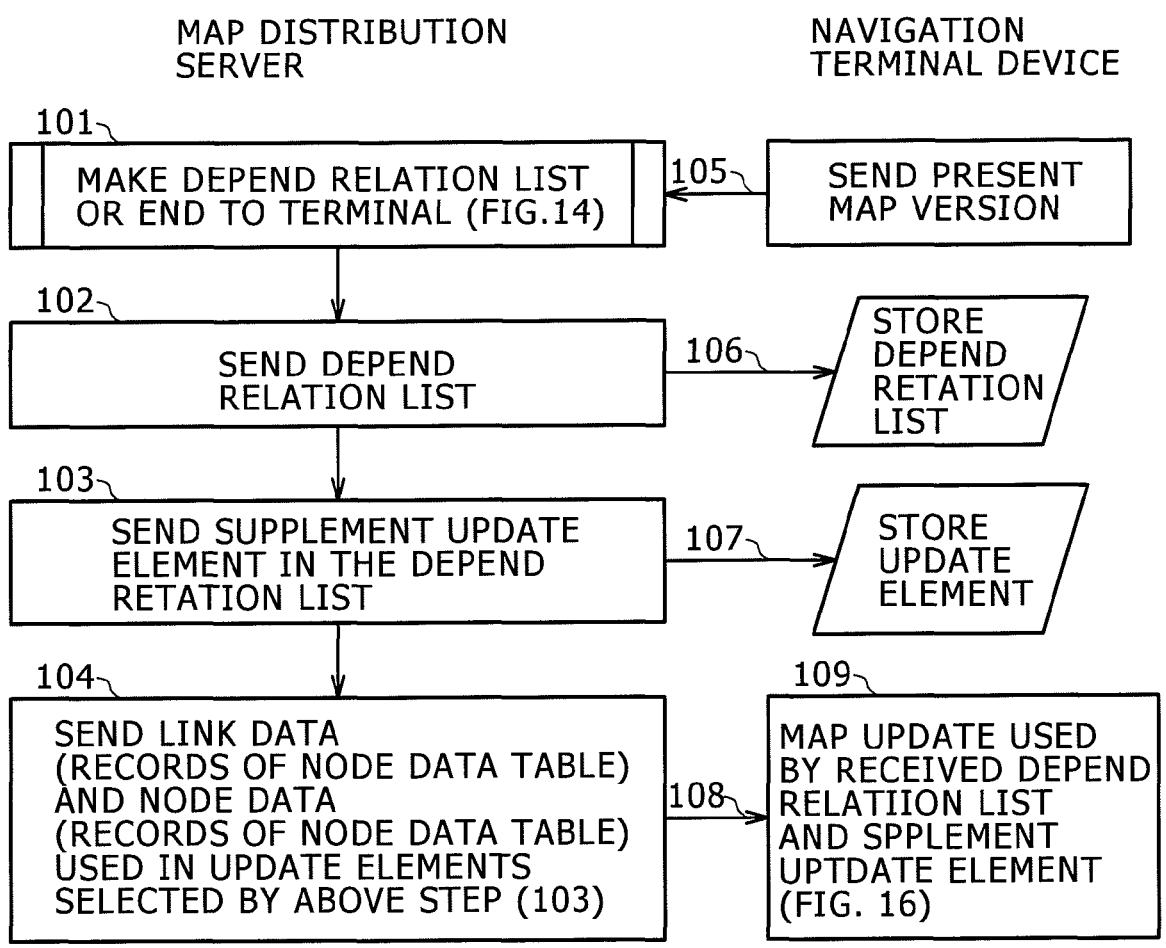
FIG. 13 is a diagram illustrating operation of delivering map update information in the map data delivering system.

FIG. 13 is a diagram illustrating operation of updating a navigation map, i.e., delivering map update information. This process does not relate to the aforementioned supplement map information based map updating, but a regular map updating (i.e., a regular update element based updating).

In the navigation terminal 20, the distribution request unit 22 creates a map distribution request including a current map version when a predetermined event occurs, and transmits the map distribution request to the map distribution server 10 through the network I/F 21 (105). The predetermined event may be a map distribution request from a user through the display input/output I/F unit 25 or previously established time or time elapse, but not limited thereto.

The map distribution server 10 creates a dependency list, which will be described later, when the update management data selector 13 receives a map distribution request from the navigation terminal 20 through the network I/F 15 (101). Then, the created dependency list is transmitted to the navigation terminal 20 through the network I/F 15 (102). The navigation terminal 20 stores the dependency list transmitted in step 102.

Subsequently, the update management data selector unit 13 searches a corresponding regular update element from the update element table based on the dependency list created in step 101, and transmits the element to the navigation terminal 20 through the network I/F unit 15. The navigation terminal 20 stores the regular update element transmitted in step 103. Furthermore, the update management data selector unit 13 searches the link data (i.e., records of the link data table) and the node data (i.e., records of the node data table) objected by the regular update element searched out in step 103, and transmits the records to the navigation terminal 20 through the network I/F unit 15 (104).

The navigation terminal 20 executes a map update process, which will be described later, using the received update element management table, the update element, and the node and link data to update the map (109).

Figure 14:
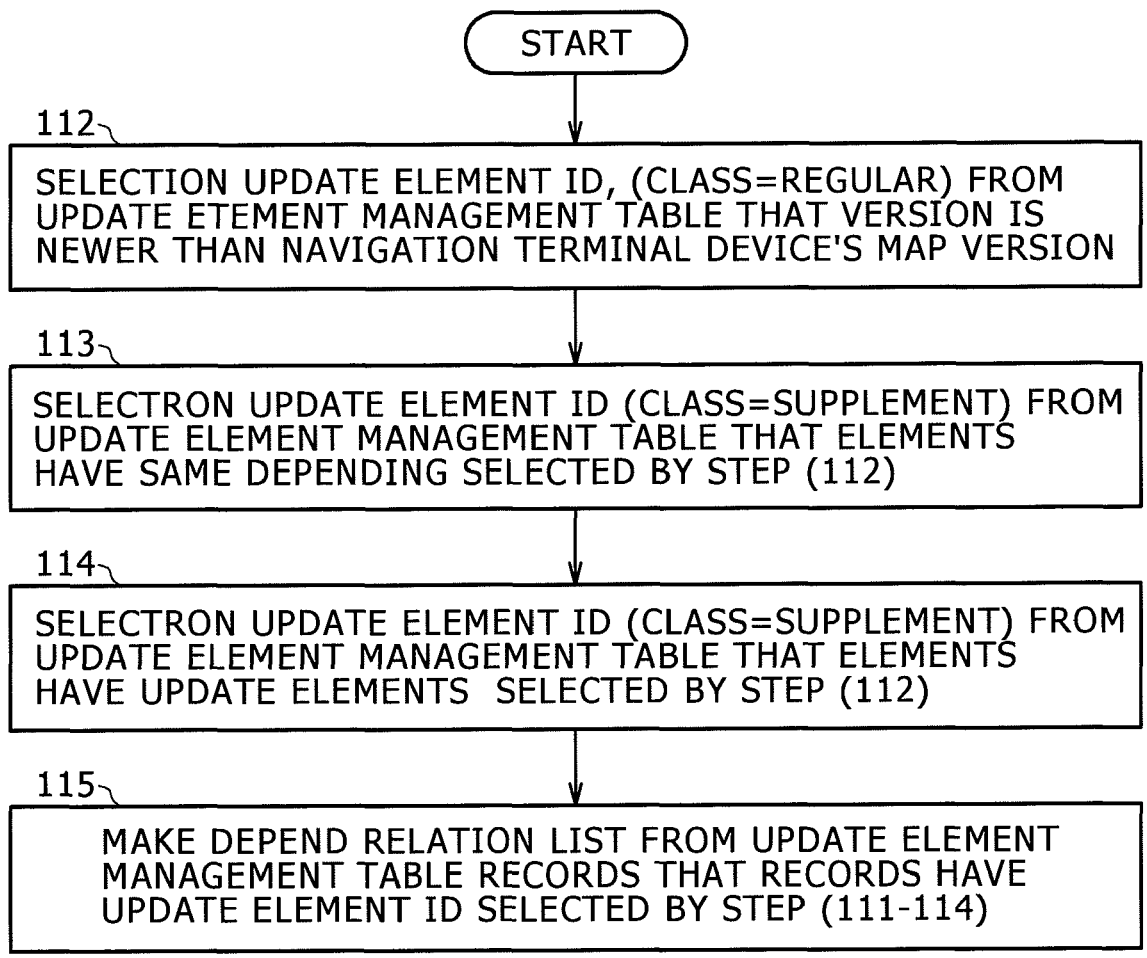
FIG. 14 is a flowchart illustrating a process of creating a dependency list in the map data delivering system.

FIG. 14 is a flowchart illustrating a process of creating a dependency list shown in step 101 of FIG. 13. This process will be described by exemplifying a dependency list of FIG. 15.

First, an update element ID (class=regular) having a newer version than the obtained map version of the navigation terminal 20 is selected from the update element management table (112). In an example of FIG. 15, if the map version of the navigation terminal 20 is set to a version Ver. 1, the update elements e21, e22, and e23 are selected.

Figure 15:
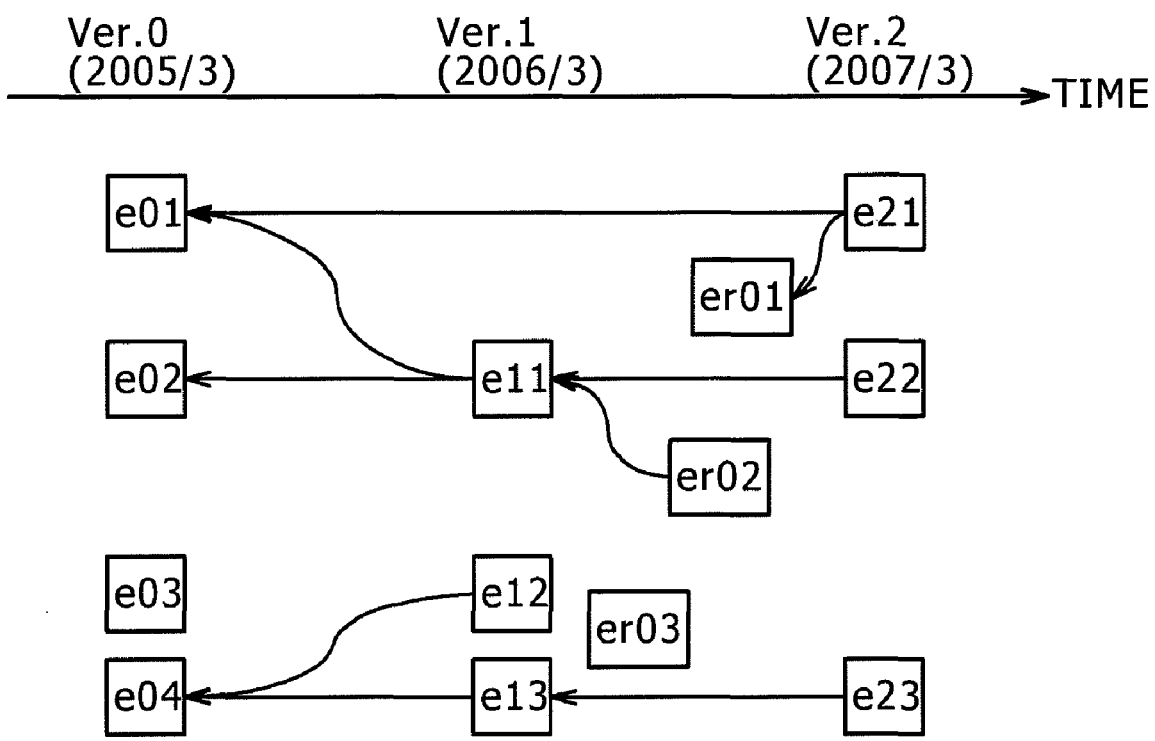
FIG. 15 is a diagram illustrating dependency of update elements in the map data delivering system according to an embodiment.

Subsequently, an update element ID (class=supplement) having the same destination as that of the update element selected in step 112 is selected from the update element management table (113). In the example of FIG. 15, the update element er02 is selected.

Furthermore, an update element ID (class=supplement) depending on the update element selected in step 112 is selected from the update element management table (114). In the example of FIG. 15, the update element er01 is selected.

Then, among the records of the update element management table, a record having the update element ID selected in the above steps 111 to 114 is included in the dependency list (115). In the example of FIG. 15, the update elements e21, e22, e23, er01, and er02 are included. They correspond to the update element IDs of update element management table of FIG. 6B.

Figure 16:
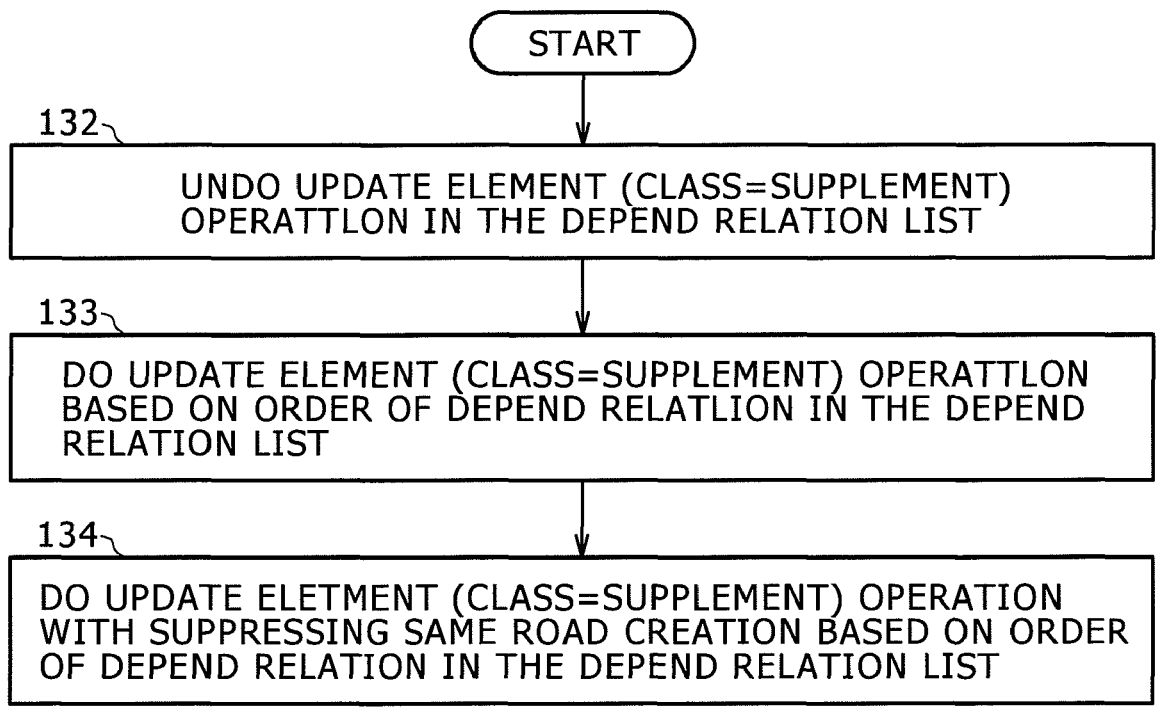
FIG. 16 is a flowchart illustrating a map update process in the map data delivering system.
Figure 17A:
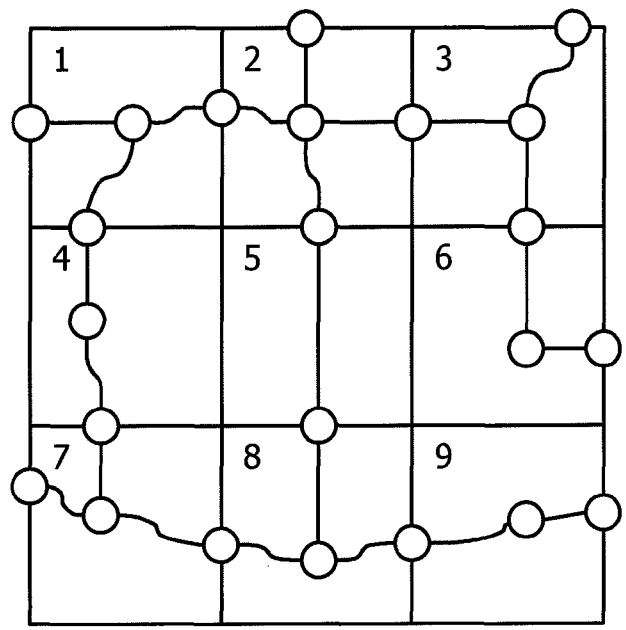
FIGS. 17A and 17B are diagrams illustrating a conventional map network and an example of supplement map information applied thereto.
Figure 17B:
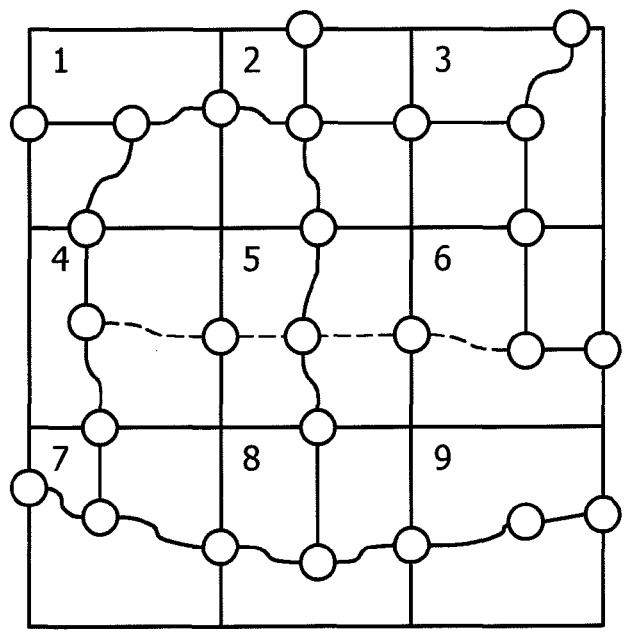
Figure 18A:
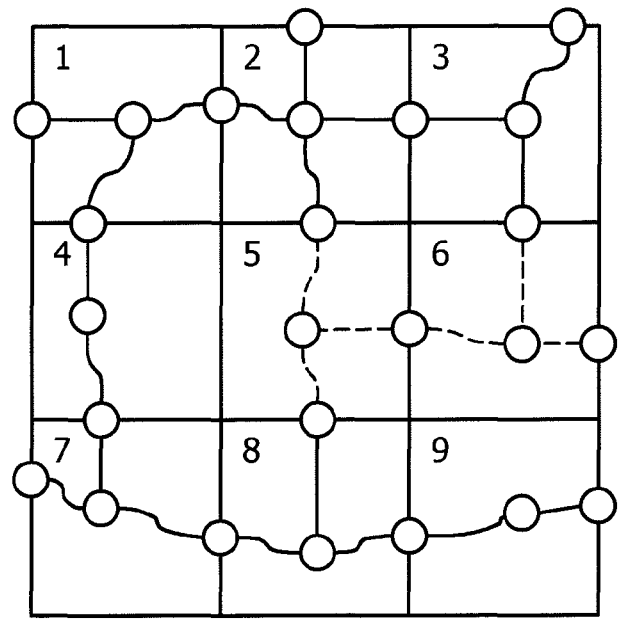
FIGS. 18A and 18B are diagrams illustrating a conventional map network and another example of supplement map information applied thereto.
Figure 18B:
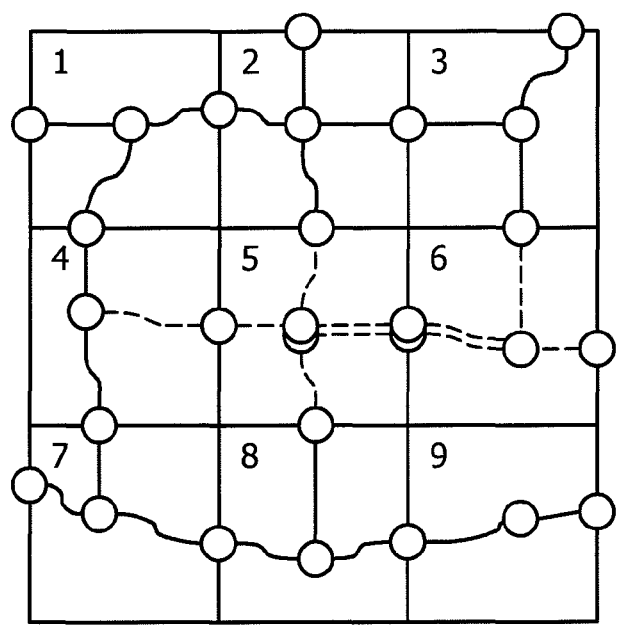

FIG. 16 is a flowchart illustrating a map update process shown in step 109 of FIG. 13.

First, the operation of the update element (class=supplement) in the dependency list is returned to its original state. Specifically, the added link/node added in addition operation (operation=addition) is deleted, and the link/node deleted in deletion operation (operation=deletion) is added (132).

Subsequently, operation of the update element data (class=regular) is executed based on the order of the dependency in the dependency list (133).

Operation of the update element data (class=supplement) is executed based on the order of the dependency in the dependency list (134). In this operation, when the map of a version Ver. 2 includes map information of the update element data (class=supplement), the same road is redundantly created. For this reason, in creation of the map information based on the supplement update element in step 134, redundant creation of the same road is prevented as follows.

Specifically, if a link or node is already present in the same location when a link or node is added, operation of addition is not executed. Through this process, it is possible to prevent redundant creation of the same road. Determination of the same location of the node is performed by a coordinates matching. Determination of the same location for the link is performed by determining whether or not there is another link having the same start and end nodes as those of the link.

Through the aforementioned processes, it is possible to allow a user to use together the supplement map information arbitrarily created from route information and the map updating. In addition, it is possible to prevent information loss or redundant storing operation when the map is updated. Therefore, it is possible to utilize a traffic sign or a route searching algorithm of the conventional car navigation without change.

Although a road network including links and nodes has been exemplified in the aforementioned embodiment, the present invention can be applied to point of interest (POI) information. In other words, POI information can be used to update a map and the update element or the supplement update element.

An example of a POI information management table is shown in FIG. 19. The POI information is represented in a format nearly identical to that of the node. Information for specifying each of the POI information is identical to that of the node. For this reason, it is possible to apply the same process to the POI as that of the node in a process of creating the update element and the supplement update element and other relating processes. In other words, for the POI information, the present invention can be applied by treating the POI as an update element or a supplement update element including only nodes.

What is claimed is:

1. A map data delivering system having a communication terminal and a map data delivering device for delivering map data to the communication terminal, wherein the map data delivering device includes:

a memory;

a storage unit for storing differential update data which include node data and link data for representing a difference before and after updating of the map data, an update element representing a set of the differential update data, and update element management data containing an update element ID for identifying the update element, a class of the update element, a located area overlapped with a map area of the differential update data, an update date before the updating of the map data, and a dependent update element ID for storing dependency on updating of corresponding map data;

a map distribution request receiver which receives a request for delivering the update element, the update element management data, and the differential update data from the communication terminal;

an update management data selector which selects the update element management data having the dependent update element ID from the storage unit among the update element management data having the located area overlapped with the map area of the distribution request and the corresponding update element management data; and an update data distribution unit for transmitting the update element and the differential update data managed by the selected update element management data and the corresponding update element management data to the communication terminal, and wherein the communication terminal has a map update unit which deletes the link and node of which operation of the update element is designated as addition and adds the link and node of which operation is designated as deletion with reference to the class of the received update element management data and contents of the update element having a class of supplement to invalidate the updating by the update element having the class of supplement, and performs updating by applying contents of the update element having a class of regular with reference to the class of the received update element management data;

wherein at least one of the communication terminal and the map data delivering device is implemented at least in part, by a central processing unit (CPU).

2. The map data delivering system according to claim 1, wherein the update management data selector executes a process of selecting the update element management data having the located area from the management data storage unit until the dependent update element ID affecting the updating of the map data is not included.

3. The map data delivering system according to claim 1, wherein the differential update data includes point of interest (POI) information.

4. The map data delivering system according to claim 1, wherein the distribution request includes a map version of the communication terminal or the update time information, and the update data delivering unit delivers the update element management data, the update element, and the corresponding differential update data having a version of the map or the update time information obtained at the time of or later than a version of the map or the update time information included in the distribution request among the update element management data selected by the update management data selector.

5. A method of delivering map data in a map data delivering system having a communication terminal and a map data delivering device for delivering map data to the communication terminal, the method comprising:

by the map data delivering device, storing differential update data which include node data and link data for representing a difference before and after updating of the map data, an update element representing a set of differential update data, and update element management data containing an update element ID for identifying the update element, a located area overlapped with a map area of the differential update data, an update date before the update of the map data, and a dependent update element ID for storing dependency on updating of corresponding map data;

receiving a request for delivering the update element, the update element management data, and the differential update data from the communication terminal;

selecting the update element management data having the dependent update element ID among the update element management data having the located area overlapped with the map area of the distribution request and the corresponding update element management data; and transmitting the update element and the differential update data managed by the selected update element management data and the corresponding update element management data to the communication terminal, and by the communication terminal, deleting the link and node of which operation of the update element is designated as addition and adds the link and node of which operation is designated as deletion with reference to the class of the received update element management data and contents of the update element having a class of supplement to invalidate the updating by the update element having the class of supplement; and performing updating by applying contents of the update element having a class of regular with reference to the class of the received update element management data.

6. The method according to claim 5, wherein the process of selecting the update element management data having the located area from the management data storage unit is executed until the dependent update element ID affecting the updating of the map data is not included.

7. The method according to claim 5, wherein the differential update data includes point of interest (POI) information.

8. The method according to claim 5, wherein the distribution request includes a map version of the communication terminal or the update time information, and the update element management data, the update element, and the corresponding differential update data having a version of the map or the update time information obtained at the time of or later than a version of the map or the update time information included in the distribution request among the selected update element management data are delivered.

9. A communication terminal which receives map data from a map data delivering device, the communication terminal comprising:

a memory a distribution request unit which delivers, to the map data delivering device, a request of differential update data which include node data and link data for representing a difference before and after the updating of the map data, an update element representing a set of the differential update data, and update element management data containing an update element ID for identifying the update element, a class of the update element, a located area overlapped with a map area of the differential update data, an update date before the update of the map data, and a dependent update element ID for storing dependency on updating of corresponding map data;

a receiver unit which receives the update element, the update element management data, and the differential update data from the map data delivering device;

a management data storage unit which stores the update element and the update element management data;

a map data storage unit which stores the differential update data; and a map update unit which deletes the link and node of which operation of the update element is designated as addition and adds the link and node of which operation is designated as deletion with reference to the class of the received update element management data and contents of the update element having a class of supplement to invalidate the updating by the update element having the class of supplement, and performs updating by applying contents of the update element having a class of regular with reference to the class of the received update element management data, and then, performs updating by applying contents of the update element having a class of supplement with reference to the class of the received update element management data;

wherein at least one of the distribution request unit, the receiver unit and the map update unit, is implemented at least in part, by a central processing unit (CPU).

10. The communication terminal according to claim 9, wherein the distribution request unit requests to deliver the update element, the update element management data, and the corresponding differential update data having a version of the map or the update time information obtained at the time of or later than a version of the map or the update time information of the communication terminal.

* * * * *